Patented Apr. 4, 1944

2,345,948

UNITED STATES PATENT OFFICE 2,345,948

RESINOUS COMPOSITION

Fred G. Pellett, Alplaus, N. Y., assignor to General Electric Company, a corporation of New York No Drawing. Application May 2, 1941, Serial No. 391,547

5 Claims. (Cl. 260—75)

This invention relates to compositions comprising certain novel alkyd resins and to a process of preparing the same. It is particularly concerned with alkyd resins containing as a polybasic acid component thereof 3,6-endomethylene tetra-hydrophthalic acid or anhydride commercially known as "Carbic anhydride" and obtained by reacting cyclopentadiene with maleic anhydride.

It is an object of the invention to provide alkyd resins of the type indicated which in their cured or finished state are tough, strong and water-resistant to such an extent as to be particularly suited for the manufacture of bonded-mica products.

As is well known, alkyd resins broadly comprise the products of reaction of polyhydric alcohols with polybasic acids. To prevent a darkening of the final products or to prevent the premature conversion of some alkyd resins to a gel-like state, the resin forming reactions have usually been carried out in the absence of air, preferably in the presence of inert atmospheres such as a nitrogen atmosphere. In so far as I am aware, it has been generally understood previously that if air had any effect on the alkyd resin forming reaction it was a catalytic effect causing a premature gelation or setting up of the reaction mixture.

I have now found that in the preparation of alkyd resins from the above-mentioned 3,6-endomethylene tetrahydrophthalic anhydride or acid and certain polyhydric alcohols or alcohol mixtures, air not only has a pronounced inhibitory effect on the formation of gels but also permits the production of strong, tough, water-resistant products if intimately contacted with the reaction mixture during the course of the reaction. This intimate contact is preferably obtained by air blowing the reactive mixture of a polyhydric alcohol and the 3,6-endomethylene tetrahydrophthalic anhydride or a derivative thereof during at least a major portion of the time these materials are being heat-reacted to form a resinous material. Unlike any of the prior art methods of which I am aware, positive steps are taken in accordance with my invention to insure intimate contact of the reaction mixture with air or the active components thereof during the resin forming reaction.

The following examples presented for purposes of illustration only are intended to describe more fully my invention:

Example I

| | Per cent |
|---|---|
| Carbic anhydride | 73 |
| Glycerine | 27 |

The ingredients are placed in an aluminum or glass container which is provided with a stirring arrangement, a reflux and means such as a glass tube for introducing air into the reaction mixture. The ingredients are heated to about 170° to 180° C. and air is continuously bubbled therethrough during the cooking period. The cook is continued for about 3½ to 5 hours, i. e., until the cure is about 20 seconds on a 200° C. hot plate after which the liquid resin is removed from the container and cooled as rapidly as possible.

Example II

For purposes of comparison with the resin of Example I, a resin made as follows may be considered.

Ingredients and procedure are the same as for Example I except that nitrogen is used in place of air. In this case, the requisite end point of a 20 second cure on a 200° C. hot plate is reached in about two hours.

Example I may be favorably compared with Example II in a variety of ways. To obtain the same end point, a longer cooking period is required in the preparation of the resin of Example I. If small lumps of the two resins are placed in water, the resin of Example II becomes white and cloudy much more rapidly indicating better water resistance of the resin of Example I. In a superficial examination of the resins which consists in rolling the resins between the fingers, the product of Example II powders more readily, indicating the product of Example I to be a tougher resin.

When solutions in a mixture of alcohol and toluol of the two above resins are made, and these solutions used as binders to replace shellac or glyceryl phthalate in the manufacture of pasted mica, it is found that Example I produces a mechanically tougher and stronger mica sheet than does Example II, the particular commercial advantage being better resistance of the sheet to damage during fabricating processes.

Example I is superior also to an ordinary glyceryl phthalate resin in all of the above-mentioned respects while Example II is inferior to such resins in the same respects.

Example III

A resin is made by cooking two mols of maleic anhydride with one mol of pentaerythritol at about 120° to 130° C. for about three hours or until the cure of a fairly thick film is about fifteen seconds on a 200° C. hot plate. The resin is then blended with a solution of the resin of Example I in the proportions of one part by weight to three parts of the resin of Example I. Pasted mica bonded with this blend has even better mechanical properties than that bonded with the resin of Example I. It also has better resistance to slippage under heat and pressure.

Example IV

| | Per cent |
|---|---|
| Carbic anhydride | 60 |
| Glycerine | 40 |

Cooking is substantially the same as for Example I including air-blowing during the cook. The resinous product is softer and less water resistant than the resin of Example I, and when used alone it does not bond mica quite as effectively as does the resin of Example I. However, when blended with the reaction product of maleic anhydride and pentaerythritol as in Example III, pasted mica sheets bonded with the resultant product have about the same physical properties as those bonded with the resinous product of Example III.

As shown from a comparison of Examples I and IV, the proportions of carbic anhydride and glycerine may be varied over a wide range. Obviously, other polyhydric alcohols may be substituted for a part or all of the glycerine provided the alcohol mixture averages more than two hydroxyl groups per molecule. Substitution of pentaerythritol for some of the glycerine results in a faster cook, less toughness and water resistance, but a mica sheet bonded with the resin shows less tendency to slip under heat and pressure. Substitution of ethylene glycol for a part of the glycerine has a somewhat opposite effect. Preferably a major portion of the alcoholic constituent should be glycerine although satisfactory resins may be prepared with other alcohols. An example of a resin prepared from a mixture of alcohols other than glycerine is as follows:

Example V

| | Per cent |
|---|---|
| Carbic anhydride | 71.4 |
| Ethylene glycol | 21.0 |
| Pentaerythritol | 7.6 |

Cooking is as in Example I and the cooking time is about the same as for Example I. The product is similar in strength and water resistance to the resin of Example I.

The resin of Example I may be oil modified by heating with the fatty acids of oils such as linseed and soya along with enough glycerine to esterify the fatty acids. Oil modified resins containing up to 50 per cent oil have been made in this way. Longer oil lengths may be made by cooking the carbic anhydride glycerine resin somewhat less before adding the fatty acids.

What I claim as new and desire to secure by Letters Patent of the United States is:

1. A composition of matter comprising the resinous product obtained by heat-reacting a mixture of ingredients consisting of endo-methylene tetrahydro-phthalic anhydride and a polyhydric alcohol component containing an average of more than two hydroxyl groups per molecule and air-blowing the reaction mixture during at least a major portion of the resin-forming reaction period.

2. A resinous product obtained by heat-reacting a mixture of ingredients consisting of endo-methylene tetrahydro-phthalic anhydride and glycerine and air-blowing the reaction mixture during a major portion of the resin-forming reaction period.

3. A composition of matter comprising a mixture of (1) a resinous product obtained by heat-reacting a mixture of ingredients consisting of endo-methylene tetrahydro-phthalic anhydride and a polyhydric alcohol containing more than two hydroxyl groups per molecule and air-blowing the reaction mixture during a major portion of the resin-forming reaction period and (2) a resinous reaction product of maleic anhydride and pentaerythritol.

4. The process of preparing a resinous composition which comprises heat-reacting a mixture of ingredients consisting of endo-methylene tetrahydro-phthalic anhydride and a polyhydric alcohol containing more than two hydroxyl groups per molecule and air-blowing the reaction mixture during a major portion of the resin-forming reaction period.

5. A process as in claim 4 wherein the polyhydric alcohol is glycerine.

FRED G. PELLETT.